United States Patent [19]

Hecking

[11] Patent Number: 5,057,215

[45] Date of Patent: Oct. 15, 1991

[54] REVERSIBLE-FLOW FILTER ASSEMBLY

[76] Inventor: Willi Hecking, Ingenieur, Askanierstr. 38, D-4050 Monchengladbach, Fed. Rep. of Germany

[21] Appl. No.: 534,928

[22] Filed: Jun. 7, 1990

[30] Foreign Application Priority Data

Jun. 8, 1989 [DE] Fed. Rep. of Germany ....... 3918667

[51] Int. Cl.$^5$ .............................................. B01D 35/30
[52] U.S. Cl. .................................... 210/137; 210/411; 210/416.1; 210/436
[58] Field of Search ............ 210/137, 359, 411, 416.1, 210/435, 436, 443, 451

[56] References Cited

FOREIGN PATENT DOCUMENTS 3435128 4/1986 Fed. Rep. of Germany.
3714660 11/1988 Fed. Rep. of Germany.

Primary Examiner—Stanley S. Silverman
Assistant Examiner—Robert James Popovics
Attorney, Agent, or Firm—Mallinckrodt & Mallinckrodt

[57] ABSTRACT

A reversible-flow filter assembly to be installed into a flow conduit, has a filter housing with a housing inner wall and an outlet socket projecting coaxially thereto centrally into the interior of the filter housing. Further, the filter housing has a guiding member arranged coaxially thereto but spaced therefrom in the filter housing. The interspace between outlet socket and guiding member is bridged by a filter forming an annulus. The inlet is connected to the annulus. A suction device engages the outer surface of the filter with a limited suction opening. The suction device forms a housing fixed annulus, which is connected to the suction opening engaging the filter and can be connected to the drain through an outlet valve. The filter is located in a filter support which is movably guided on the outlet socket by a first guiding element and on the guiding member and in the suction device by a second guiding element. A control pressure chamber below the second guiding element is connected to the annulus. The filter support is loaded by a spring.

7 Claims, 3 Drawing Sheets

000
REVERSIBLE-FLOW FILTER ASSEMBLY

TECHNICAL FIELD

The invention relates to a reversible-flow filter assembly for installation in a flow conduit.

BACKGROUND ART

By DE-A-34 35 128 a filter assembly for installtion in a flow conduit is known, which has a connecting portion with two aligned connecting sockets for installation in a flow conduit. These two connecting sockets form the inlet and the outlet of the filter assembly. The connecting portion comprises a lateral tubular outer projection. An inner projection is provided coaxially in the outer projection. The outer projection forms an annulus around the inner projection. This annulus is connected to the inlet. The annulus is separated from the outlet by a partition. The outlet is connected to the interior of the inner portion. A filter cup is fixed with its edge to the outer projection. A cylindrical filter, a "filter candle", is located on the inner projection. The filter, at its end remote from the connecting portion, is held in a guidance, which is provided at the bottom of the filter cup. The filter cup has an aperture at its bottom. A pressure reducer is inserted into the filter assembly coaxially to the filter. The inner projection has a central aperture, into which a valve seat of the pressure reducer is sealingly inserted.

In this prior art filter assembly the water flows from the inlet through the annulus of the connecting portion into the space between filter cup and filter. Then it flows through the filter around the housing of the pressure reducer and through the valve of the pressure reducer into the inner projection and to the outlet. The outlet pressure is controlled by the pressure reducer.

This prior art filter assembly does not permit any backwashing of the filter. Therefore, it is necessary to exchange or clean the filter in certain time intervals. To this end, the filter assembly has to be detached. For that purpose the water supply has to be shut off, such that the supply is temporarily interrupted.

Filter assemblies are known, which permit backwashing. The filter can be cleaned without the need of dismantling the filter assembly or of interrupting the water supply.

In a prior art filter assembly of this type, the water is guided from the inlet into the interior of a cylindrical filter. Then it flows from the inside outwards through the filter and then flows on the outside of the filter through the annulus between filter and housing to the outlet. In the interior of the filter a backwashing device is axially movably guided. This backwashing device has limited suction openings, which engage the inner surface of the filter on two axially spaced ring surfaces. These suction openings communicate with an outlet valve through passages. The outlet valve is opened by hand to obtain cleansing of the filter by backwashing. Then the backwashing device is axially shifted, also by hand, such that the suction openings move over the whole inner surface of the filter. The use of limited narrow suction openings offers the advantage, that a high flow rate results in backwashing direction through the filter, without the total amount of the water amount flowing through the outlet valve to a drain becoming inadmissably large. The pressure difference between water conduit pressure and atmospheric pressure in the drain essentially is maintained across the suction openings. The high flow rate ensures, that the impurities retained by the filter are washed out with good efficiency during the backwashing process.

The prior art filter assembly requires manual operation both of the outlet valve and of the means for axially shifting the suction device. Because the suction tube is inside the filter, it is not possible to provide a pressure reducer at that location to save space, as this is done in the filter assembly of DE-A-34 35 128 mentioned first.

Further, a filter assembly permitting backwashing is known (company brochure "Rückspülbare Hauswasser Station HS 10" of Honeywell Braukmann), wherein two cylindrical filters are arranged in a filter cup, which is attached to a connecting piece. The filter cup is similarly constructed as in the prior art filter assembly mentioned first. It has aligned connecting sockets as inlet and outlet and an outer and and inner tubular lateral projection. The filter cup is connected to the outer projection, which is connected to the inlet. The first cylindrical filter is fixedly connected to the inner projection. The second cylindrical filter is arranged coaxial to the first filter and is axially movable. The second cylindrical filter is closed by a plate at its end face remote from the first filter. A spring urges the second filter in the direction towards the connecting piece. The displacement of this second filter against the action of the spring is limited by a stop. An outlet valve is provided at the bottom of the filter cup.

In normal operation, the water flows, as in the filter assembly already described above, from the inlet through the annulus between filter cup and filters from outside to the inside through both of the filters and then inside the filter to the inner projection and to the outlet. The outlet valve is opened for backwashing. Thereby the second cylindrical filter is shifted a little towards the bottom of the filter cup due to the water pressure acting on the plate. Thereby the annulus formed around the second filter is separated from the annulus around the first filter, which annulus is connected to the inlet, due to an edge of the filter cup projecting inwards and an edge at the upper end of the second filter projecting outwards. Now the water flows from the inlet only through the first filter. However, in the second filter, filtered water flows in an opposite direction, from the inside-out, to the outlet valve and to a drain.

In this prior art arrangement, only part of the total filter surface, namely the second filter, is cleaned by backwashing. Water flows simultaneously through the whole surface of the second filter. If in such an arrangement the total water is limited, the flow rate of the water during the backwashing becomes rather low. Therefore, the cleaning effect of the backwashing is limited.

DE-A-37 14 660 shows a filter assembly to be installed a flow conduit. The filter assembly comprises a cylindrical filter and a suction device, which engages the outer surface at the inlet side with limited suction openings. The suction device can be connected to a drain through an outlet valve. A displacement member is provided to move the suction device over the surface of the filter. This displacement member is exposed, on one side, by pressure of the inlet and, on the other side, limits a space, which is connected to the inlet through the suction tube acting as restrictor and is closed by the outlet valve. A pressure difference across the displacement member and the suction device results when the outlet valve is opened. Thereby the displacement member is displaced relative to the housing fixed filter. The suction device is attached to the displacement member, such that the suction device is moved thereby over the surface of the filter. The pressure difference at the narrow suction opening of the displacement member causes a strong flow through the filter and into the suction opening, such that the filter is washed in the reverse flow. A pressure reducer is centrally located in the filter and projects with a tubular housing into the filter housing.

The prior art construction is rather expensive. The filter is held at the outlet socket and at the housing of the pressure reducer through supporting rings. Then, in addition, the displacement member is necessary, which is slidably guided and from which the suction passages project upwards around the filter and support the suction openings at their upper end. The displacement of the displacement member is limited, because the displacement member, in its position of res, has to be below the lower supporting ring of the filter. Therefore two sets of different length suction passages with associated suction openings are required. The suction passages are mounted on the displacement member at one end only and engage the filter with their free ends with the suction openings. Thereby no safe engagement is ensured.

DISCLOSURE OF THE INVENTION

It is an object of the invention to provide a simple and compact construction of a reversible-flow filter assembly of the type defined at the beginning.

According to the invention this object is achieved, in that (f) the suction device forms a fixed housing annulus, which communicates with the suction opening engaging the filter and is arranged to be connected to the drain through the outlet valve, (g) the filter is located in a filter holding device, which is slidably guided by a first guiding element on the outlet socket, and by a second guiding element on the guiding member and in the suction device, whereby an actuating pressure chamber is defined by the housing inner wall, the guiding member (76), and the second guiding element, (h) the actuating pressure chamber communicates with the annulus of the suction device and (i) the filter holding device is loaded by a spring in a direction to expand the actuating pressure chamber.

Thus, according to the invention, the filter is axially movable, while the suction device is stationary in the filter housing. Thereby, the displacement of the filter is initiated by the pressure difference across the second, lower guiding element of the filter holding device. This second lower guiding element has the function of the supporting ring in the prior art filter assembly according to DE-A-37 14 660. No additional displacement member for the suction device is required. The suction device is supported by the housing inner wall and, therefore, always closely engages the filter with its suction openings. The filter can be displaced by such a distance that the whole surface of the filter can be sucked off with one displacement.

Modifications of the invention are subject matter of the dependent claims.

An embodiment of the invention will now be described in greater detail with reference to the accompanying drawings.

PREFERRED EMBODIMENT OF THE INVENTION

Figure 1:
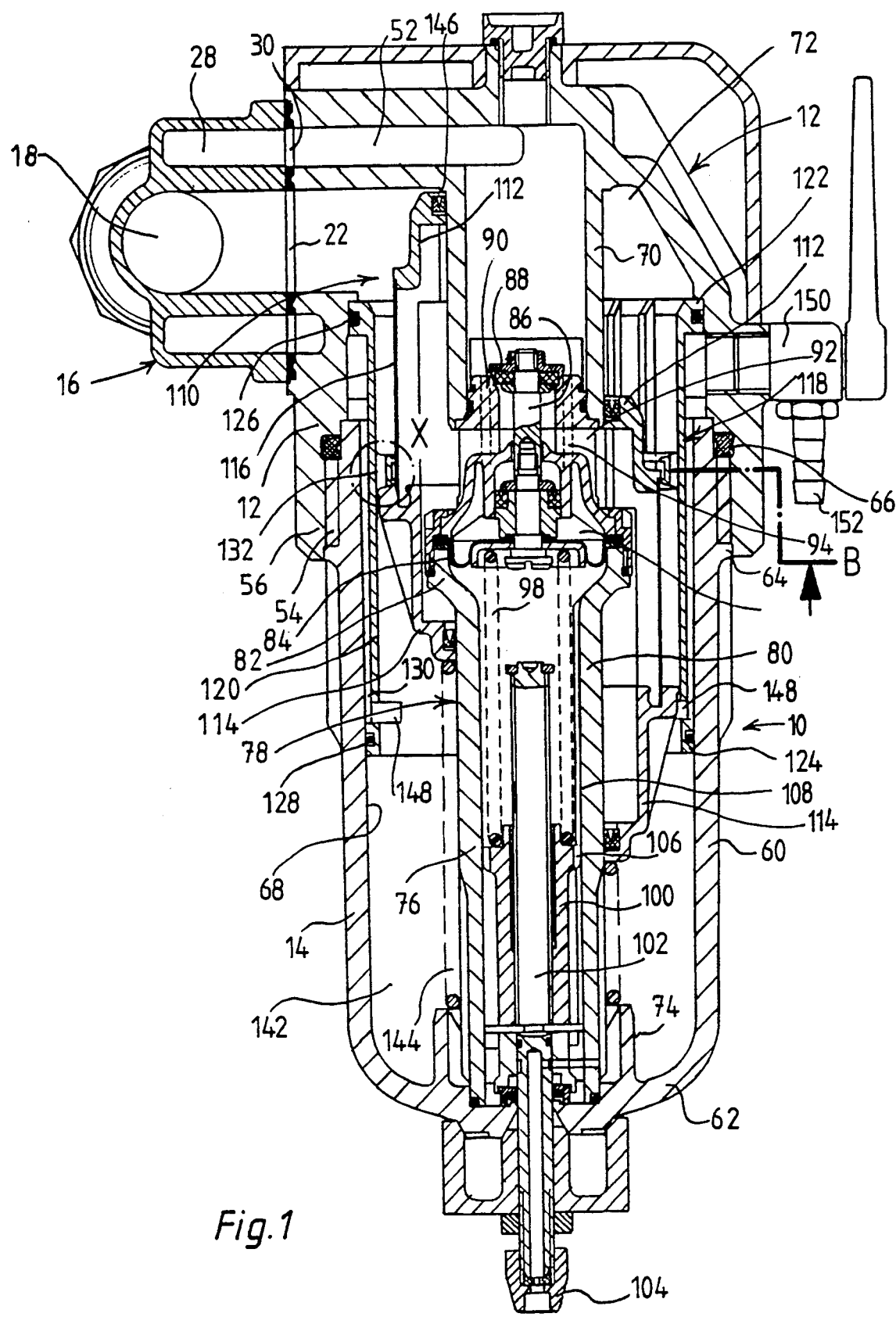
FIG. 1 shows a longitudinal section through a reversible-flow filter assembly, the filter assembly being illustrated in its normal operational position on the left side of FIG. 1 and being illustrated in its backwashing position on the right side.

In FIG. 1 the filter housing 10 consists of a housing upper part 12 and a filter cup 14. The housing upper part is laterally fixed to a connecting piece 16, which is installed in a conduit.

The connecting piece 16 has an inlet passage 18 with an inlet socket 20. The inlet passage 18 is deflected through a right angle within the connecting piece 16 and ends in a central connecting port 22 in a connecting plane of the connecting piece 16. Further, the connecting piece 16 has an outlet passage 24. The outlet passage 24 ends in an outlet connecting socket 26. The outlet connecting socket 26 is in alignment with the inlet socket 20. The outlet passage 24 forms an annulus 28, which coaxially surrounds the deflected portion of the inlet passage 18 and ends in an annular connecting port 30 in the connecting plane of the connecting piece 16. The connecting port 30 coaxially surrounds the connecting port 22.

Two adapters 32 and 34 serve to install the connecting piece 16 in a conduit (not illustrated). The adapters 32 and 34 are screwed with threads 36 or 38, respectively, into the ends of the conduit. The adapters 32 and 34 are provided with flanges 40 or 42, respectively, adjacent to the connecting piece. Union nuts 44 or 46, respectively, extend over the flanges 40 or 42, respectively and are screwed onto threads 48 or 50, respectively, of the inlet or outlet connecting sockets 20 or 26, respectively. The connection to the housing upper part 12 is established in the connecting plane. The common axis of inlet and outlet connecting sockets 20 or 26, respectively, is parallel to the connecting plane. The connecting piece is made of metal and is able to take up tensions, which may occur in the conduit. The housing upper part 12 is relieved from these tensions and can be made of plastics, for example.

The housing upper part 12 has an annulus 52, which is in alignment with the connecting port 30 and is connected to the annulus 28 and the outlet passage 24 through this connecting port.

The housing upper part 12 has a cylindrical collar 56 provided with an internal screw thread 54. The filter cup 14 is screwed into this collar 56. The filter cup 14 has a cylindrical portion 60 and a bottom 62. The filter cup 14 has a flange 64, which engages the end surface of the collar 56. An O-ring 66 is located in an annular groove of the collar and provides a seal between the filter cup 14 and the housing upper part 12. Housing upper part 12 and filter cup 14 form an essentially cylindrical housing inner wall 68. The axis of this housing inner wall 68 is perpendicular to the axis of the deflected portion of the inlet passage 18 and the annulus 28 and 52.

An outlet socket 70 is located coaxial to the housing inner wall 68 in the housing upper part 12. The outlet socket 70 is connected to the annulus 52. An annulus 72 is formed around the outlet socket 70 in the housing upper part 12. This annulus 72 is connected to the inlet passage 18 through the connecting port 22.

The filter cup 14 has a collar 74 on the inside of the bottom 62. The collar 74 holds the housing 76 of a pressure reducer 78. The housing 76 is elongated and has a tubular section 80 with cylindrical outer surface. The housing 76 of the pressure reducer 78 is coaxial to the outlet socket 70. The tubular section 80 forms a guiding member, as will be described below. The pressure reducer 78 ends in a diaphragm housing 82, in which a control diaphragm 84 is clamped. The control diaphragm 84 controls a valve disk 88 through a valve stem 86. A ring shaped valve seat body 90 is located in the outlet socket 70. The valve seat body 90 is connected to the diaphragm housing 82 through webs 92, which allow the radial passage of the water flow therebetween. The valve stem 86 extends through the opening of the valve seat body 90. This opening forms a valve seat at its upper end in FIG. 1. The valve seat cooperates with the valve disc 88 located above the valve seat body 90 inside the outlet socket 70 at the end of the valve stem 86. Passages 94 extend through the valve seat body 90, webs 92 and the diaphragm housing 82. Through these passages 94 the outlet pressure, which exists in the outlet sockets 70 downstream of the control valve, is transmitted to the diaphragm chamber 96, which is formed above the control diaphragm 84 in the diaphragm housing. On the other side, at the bottom in FIG. 1, the control diaphragm 84 is loaded by a pre-tensioned helical spring 98. The helical spring 98 is supported on an abutment body 100. The abutment body 100 is guided on a threaded spindle 102. The threaded spindle can be rotated by means of an adjusting knob 104. The abutment body is non-rotatably guided with lugs 106 in longitudinal grooves 108 in the inner surface of the housing 76. Therefore, the abutment body 100 is axially adjusted, when the threaded spindle is rotated. Thereby the pre-tension of the spring 98 and thus again the desired value of the pressure reducer 78 is changed.

Water flows through the inlet passage 18 into the annulus 72, from there around the outlet socket 70, through filter 116, then through the webs through the interspace between diaphragm housing 84 and valve seat body 90 and through the opening of the valve seat body 90 and the annular gap between valve seat body 90 and valve disc 88 into the bore of the outlet socket 70. The water flows, pressure controlled and pressure limited, from the outlet socket 70 through the annulus 52 and annulus 28 to the outlet passage 24.

The filter arrangement comprises a filter support, which generally is designated by numeral 110. The filter support 110 comprises a first guiding element 112 and a second guiding element 114. The first guiding element 112 is movably guided on the outlet socket. The second guiding element 114 is guided on the cylindrical section 80 of the housing 76 of the pressure reducer 78. The cylindrical filter 116 extends between the guiding elements 112 and 114. Therefore, the flow of the water from the annulus 72 through the control valve and into the outlet socket 70 has always to pass through the filter 116.

A suction device is arranged around the filter 116. This suction device is generally designated with 118.

The suction device 118 consists of a cylindrical insert or case 120. The insert 120 has ledges 122 and 124 projecting outwardly along its edges. These ledges 122 and 124 sealingly engage the housing inner wall 68 along its whole periphery. Sealing rings 126 and 128 in annular grooves of these ledges 122 or 124, respectively, provide tight sealing. An annulus 130 is formed between the insert 120 and the housing iner wall 68 and the ledges 122 and 124. A ledge 132 projecting inwardly is formed on the inner surface of the insert 120.

Figure 4:
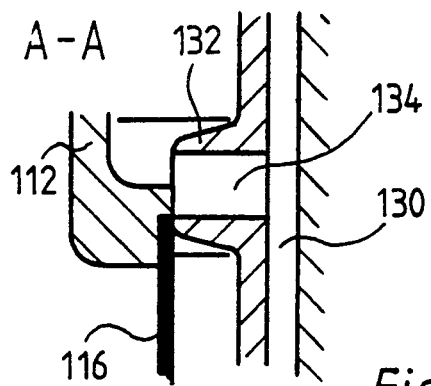
FIG. 4 shows a section "A—A" of FIG. 3.
Figure 3:
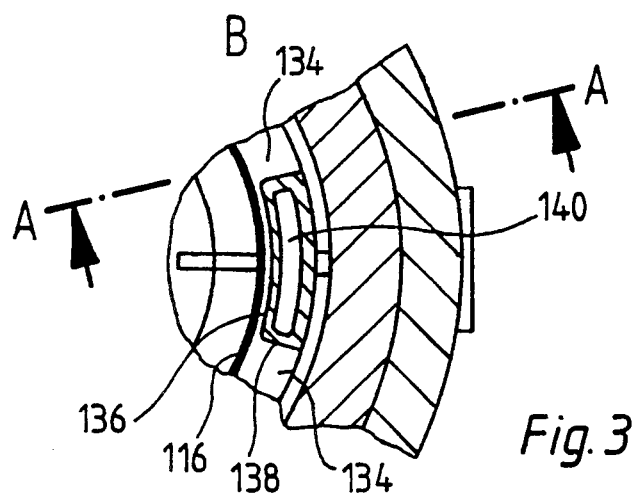
FIG. 3 shows a section "B" of FIG. 1 at an enlarged scale.
Figure 2:
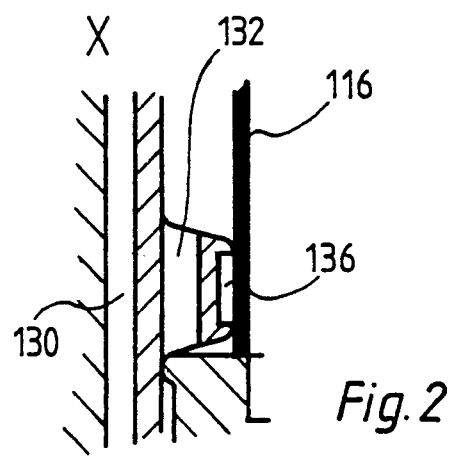
FIG. 2 shows a detail "X" of FIG. 1 at an enlarged scale.
Figure 5:
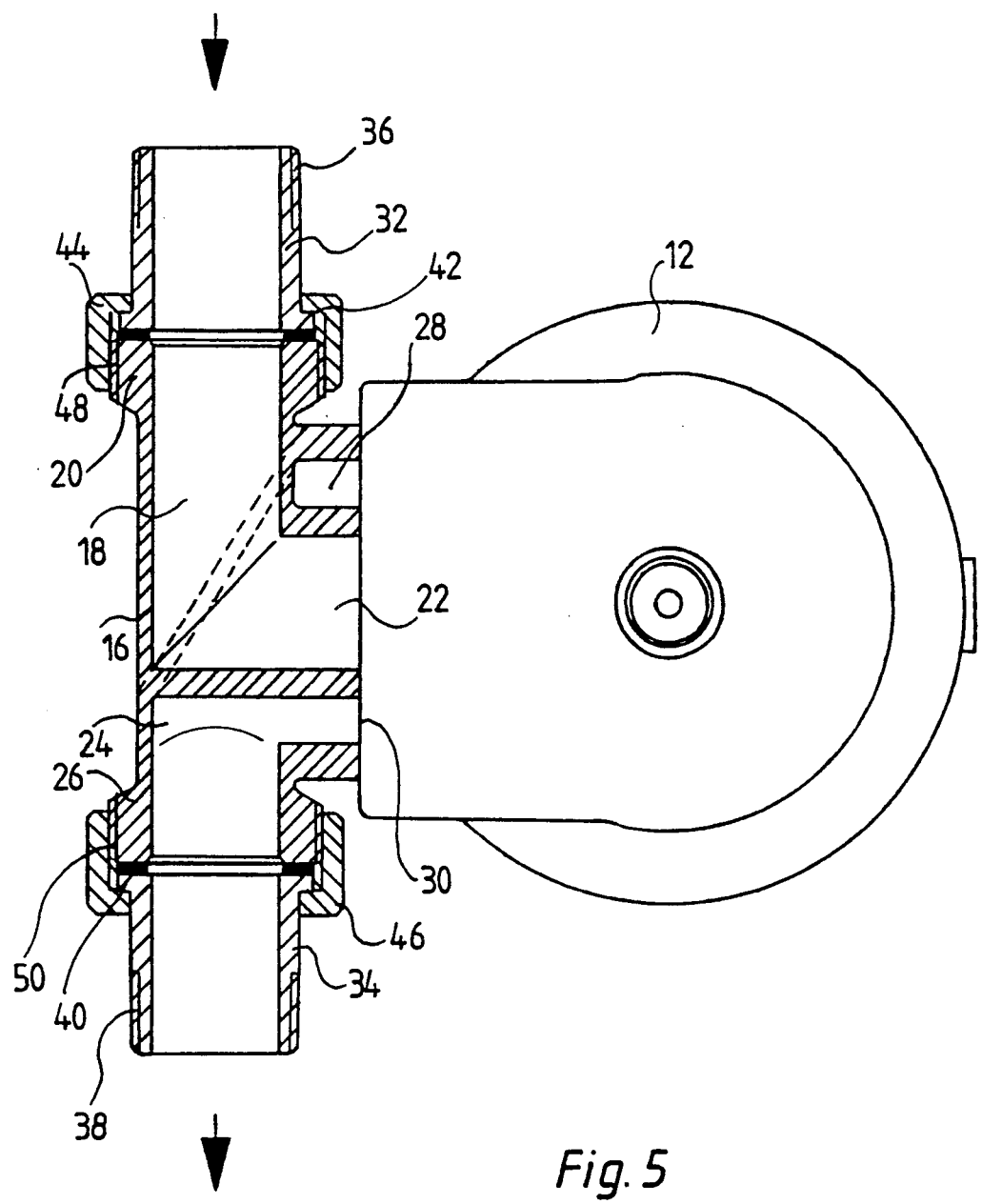
FIG. 5 shows a plan view of the filter assembly.

As can be seen best from FIG. 2 and FIG. 4, this ledge 132 has slots 134, which connect a continuous annular groove in the inner surface of the ledge 132 to the annulus 130. This annular groove forms the suction opening 136. Bridge elements 138 remain between the upper and lower side of the slots 134. These bridge elements 138 contain passages 140 (FIG. 3), which connect the upper side of the ledge 132 with the lower side of the ledge. The ledge 132 engages the filter 116 with the suction opening.

The second guiding element 114 engages the inlet 148 of the suction device 118 with its outer edge. A control pressure chamber 142 is defined in this way. The control pressure chamber is defined by the second guiding element 114, the insert 120, the filter cup 14 and the housing 76 of the pressure reducer 78. The second guiding element 114 is loaded by a pre-stressed helical spring 144, which urges the guiding element 114 upwards, such that, in the normal position, the first guiding element engages a stop 146. The helical spring is guided by the housing 76 of the pressure reducer.

The annulus 130 is connected to a control pressure chamber 142 through apertures 148. The annulus 130 is connected to a drain 152 through a hand actuated valve 150.

The described filter assembly operates as follows:

In normal operation, the valve 150 is closed. The control pressure chamber is connected to the inlet pressure through the filter, the suction opening 136 acting as flow restrictor, the annulus 130 and the openings 148. The same pressure exists on both sides, both of the first guiding element 112 and also of the second guiding element 114. The helical spring 144 urges the filter support 110 with the filter into the upper end position illustrated on the left side in FIG. 1. This upper end position is the normal operating position. The water flows through the filter 116 and the control valve of the pressure reducer 78 in the way already described above.

The valve 150 is opened for backwash of the filter. Thereby the pressure in the annulus 130 practically drops to atmospheric pressure. This pressure becomes also effective in the control pressure chamber 142 through the openings 148. A pressure difference of inlet pressure and atmospheric pressure becomes effective across the second guiding element 114 of the filter support 110. The filter support with the filter is moved downwardly into FIG. 1. The suction device is, however, housing fixed. The filter 116 is moved along the suction opening 136, water flowing from inside outwards through the suction opening 136. Coarse dirt is scratched off the filter 116 by the ledge 132 and accumulates on the ledge 132.

When the filter 116 has reached its lower end position, which is illustrated on the right side in FIG. 1, then the suction opening 136 is closely above the filter 116. This is illustrated at an enlarged scale in FIG. 4. As can be seen from FIG. 1 and 4, the upper guiding element 112 is bell shaped. The coarse dirt pushed upwards by the ledge 132 is washed into the suction opening 136 by the water flowing over the upper guiding element 112 in its upper end position. That is the dirt, which can not pass between the inner surface of the ledge 132 and the outer surface of the filter 116.

It has to be possible, also to draw water in the position of the filter 116 shown on the right side in FIG. 1. This is made possible by passages 140 in the bridge elements 138. Thus the water can flow out of the annulus 72 through the passages 140 into the space around the filter 116 shifted downwardly, through the filter 116 and again upwards through the control valve of the pressure reducer 78.

I claim:

1. A reversible-flow filter assembly for installation in a flow conduit, comprising
   (a) a filter housing (10) with a housing inner wall (68) and an outlet socket (70) coaxial thereto, projecting centrally into the interior of the filter housing (10) and connected to an outlet of the filter assembly and a guiding member (76) arranged coaxial to the outlet socket (70) but spaced therefrom,
   (b) a filter (116), which is sealingly located on the outlet socket (70) and, on the guiding member (76) and bridges the distance between outlet socket (70) and guiding member (76), such that an annulus is formed between the housing inner wall (68), and the outlet socket (70), and another between the filter (116) and the guiding member (76),
   (c) an inlet (18) which communicates with the annulus,
   (d) a suction device (118) which engages the outer surface of the filter (116) with a limited suction opening (136), and
   (e) an outlet valve (150), adapted to connect the suction device (118) to a drain (152),
wherein
   (f) the suction device (118) forms a fixed housing annulus (130), which communicates with the suction opening (136) engaging the filter (116) and is arranged to be connected to the drain (152) through the outlet valve (150),
   (g) the filter (116) is located in a filter holding device (110), which is slidably guided by a first guiding element (112) on the outlet socket (70), and by a second guiding element (114) on the guiding member (76) and in the suction device, whereby an actuating pressure chamber (142) is defined by the housing inner wall (68), the guiding member (76), and the second guiding element (114),
   (h) the actuating pressure chamber (142) communicates with the annulus (130) of the suction device (110) and
   (i) the filter holding device (110) is loaded by a spring (144) in a direction to expand the actuating pressure chamber (142).

2. A reversible-flow filter assembly as claimed in claim 1, wherein the suction device (118) is formed by a cylindrical insert (120), which has ledges (126, 128) projecting radially outwardly along its edges and engaging the housing inner wall (68), such that the annulus (130) is formed between the insert (120) and the housing inner wall (68).

3. A reversible-flow filter assembly as claimed in claim 2, wherein the suction opening (136) is provided in an annular ledge (132) formed on the inner surface of the insert (120).

4. A reversible-flow filter assembly as claimed in claim 3, wherein the insert (120) has apertures (148) close by its end facing the actuating pressure chamber (142), the annulus (130) communicating with the actuating pressure chamber (142) through said apertures.

5. A reversible-flow filter assembly as claimed in claim 1, wherein
   (a) the guiding member is a tubular housing (76) of a pressure reducer (78) and extends centrally into the filter housing (10) and
   (b) a valve seat member (90) of the pressure reducer (78) is located in the outlet socket (70) and cooperates with a valve disk (88) of the pressure reducer (78).

6. A reversible-flow filter assembly as claimed in claim 1, wherein the first guiding element (112) of the filter holding device (110) is bell-shaped and gets into an end position, when the outlet valve (150) is opened, in which end position the space on the inlet side of the guiding element (112) in the area of the edge of the guiding element (112) communicates directly with the suction opening (136).

7. A reversible-flow filter assembly as claimed in claim 6, wherein bridge elements (138) extend through the suction opening (136) and contain passages (140) for connecting the space on the inlet side of the suction opening (136) with the space on the outlet side of the suction opening (136).

* * * * *